APPLICANT
James Robert Lucking
By Misegades & Douglas
ATTORNEYS

United States Patent Office 3,422,401

Patented Jan. 14, 1969

3,422,401

ELECTRIC DATA HANDLING APPARATUS

James Robert Lucking, Kidsgrove, Stoke-on-Trent, England, assignor to English Electric Computers Limited, London, England, a British company Filed Dec. 15, 1965, Ser. No. 513,953
Claims priority, application Great Britain, Dec. 17, 1964, 51,476/64
U.S. Cl. 340—172.5 15 Claims
Int. Cl. G11b 13/00

ABSTRACT OF THE DISCLOSURE

A main computer memory, a low-capacity and high-speed memory having a plurality of locations for storing a word of information, and address register for storing an address identifying that word, a bistable indicator, means for assessing a desired word as defined by an address supplied to the system from the low-capacity, high-speed memory or the main memory according as the word is or is not stored, means for setting the bistable indicator in any location when the word stored therein is assessed, displacement selection means having scanning means for scanning each location of the scratchpad memory in cyclic sequence until a given location is reached whose indicator is of a different state and means for setting the indicator of each scanned location to such different state, transfer means for reading the word in the location at which the scanning means cease scanning for leaving an empty location, and writing such empty location into the main memory, and writing means for writing an assessed word together with its address into an empty location in the low-capacity, high-speed memory where the word is not already stored in the low-capacity, high-speed memory. The invention further relates to forms of a memory system including inhibit means responsive to "inhibit" information.

Figure 1:
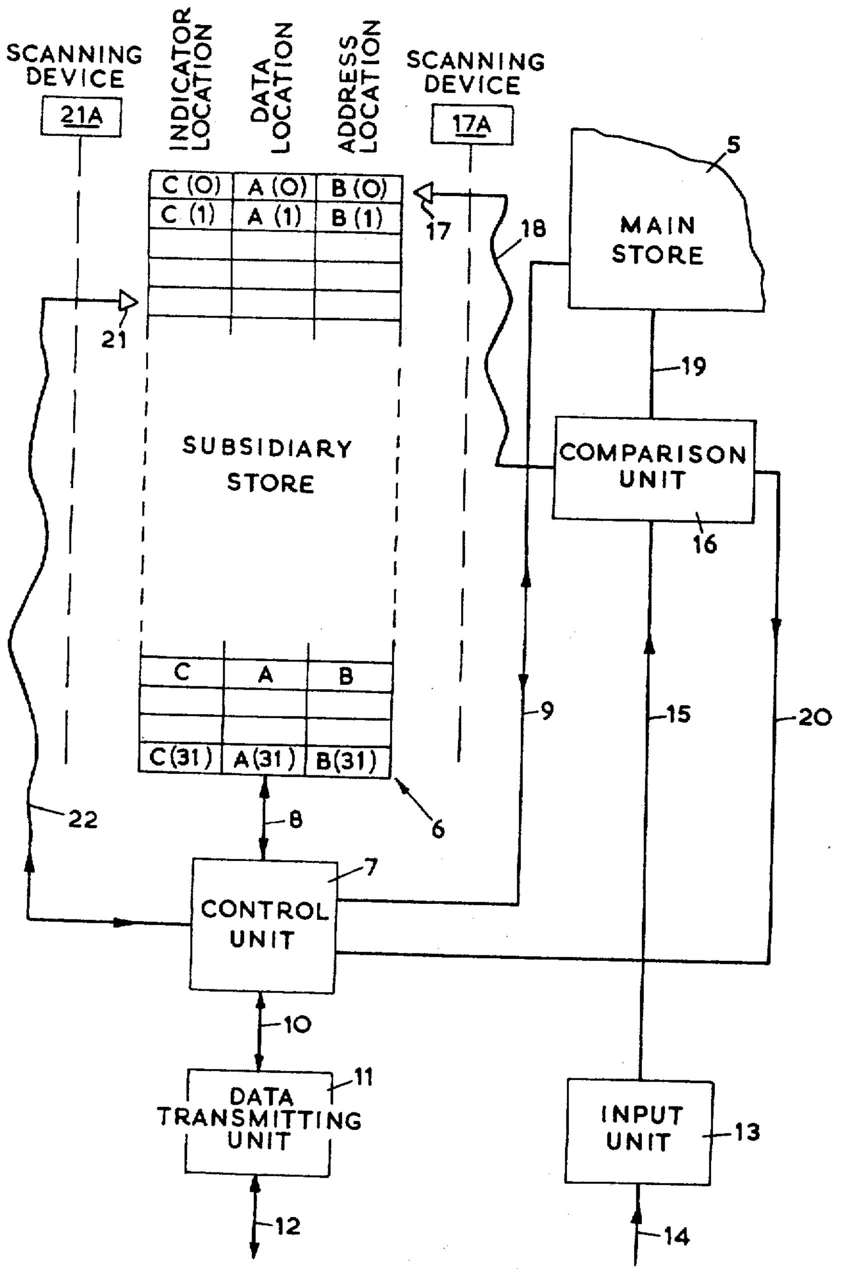

This invention relates to electric data handling apparatus.

It is known to use in a data handling apparatus such as a digital computer a store, commonly in the form of a magnetic core store, for storing data which is required in a particular data handling process which is to be carried out. Much of this data is transferred into the store in advance of its required time of use in response to specific instructions whose effect is to transfer this data from a larger store, such as a magnetic tape or disc file, which has a slower speed of access.

It is found that some items of data are frequently required in carrying out a particular process, and in order to speed up the carrying out of the process such items of data have been transferred to a further store having a still greater speed of access. For economic reasons this faster access store has a relatively small storage capacity. The present invention is concerned with the provision of means for making better use of this faster access store having regard to its limited storage capacity.

According to the present invention an electric data handling apparatus comprises a first store having a plurality of storage locations each capable of storing a group of digits (referred to hereafter as a "data group") and each having a unique address in the store, a second store which in relation to the first store is capable of giving substantially faster access to data stored therein and has a substantially smaller number of storage locations, each of these latter storage locations being capable of storing a data group obtained from a storage location in the first store, together with a group of digits (referred to hereafter as an "address group") signifying the address in the first store from whence the associated data group originated, an input channel for receiving input signals each identifying an address of a storage location to which access is required for the purpose of reading-out or otherwise modifying the data group stored at that address, comparison means responsive to each such input signal for comparing the address identified by the input signal with the respective addresses identified by the respective address groups stored in the second store and effective in the event of finding in one of the stored address groups an address corresponding with that identified by the input signal to provide access to the storage location of the second store which contains that stored address group, and in the event of not finding in the stored address groups such a corresponding address to produce a stimulating signal, accessing means responsive to each such stimulating signal for providing access to the storage location of the first store as identified by the input signal, and for causing the data group stored in that storage location to be stored, together with its associated address group, in a selected "free" storage location in the second store, and selecting means responsive to each such stimulating signal for selecting as the next free storage location in the second store that storage location to which in an immediately preceding time period access has least frequently been required by the input signals received.

If desired, inhibiting means may be provided, such inhibiting means being responsive to "inhibit" information stored in a storage location of the first store for the purpose of identifying the data group stored in that storage location as one requiring slower access only, and being effective in response to the detection thereby of such inhibit information to prevent the accessing means causing the storage of such a data group in the second store.

Other inhibiting means may also be provided, this second inhibiting means being responsive to "inhibit" information stored in a storage location of the second store for the purpose of identifying the data group stored in that location as one requiring faster access only, and being effective in response to the detection thereby of such inhibit information to prevent the selecting means from selecting as the said next free storage location any such storage location which has such inhibit information stored therein.

According to a preferred feature of the present invention the selecting means is arranged to select as the next free storage location that storage location of the second store to which, since the selecting means made its previous selection, access has least recently been required by the input signals.

A data handling apparatus according to the present invention and comprising part of an electric digital computer will now be described by way of example and with reference to the accompanying drawings.

Figure 2:
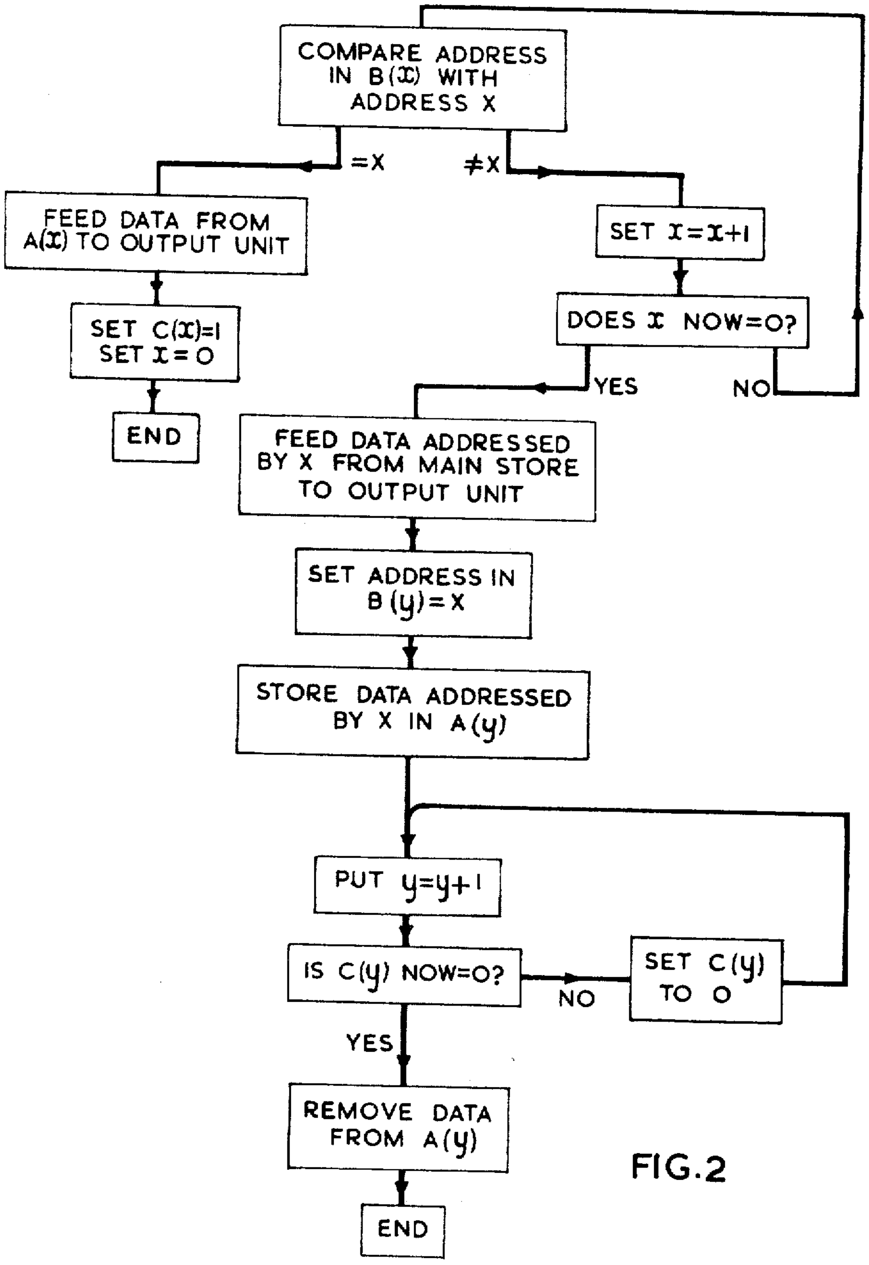

In the drawings, FIGURE 1 shows diagrammatically the constituent members of the apparatus and the manner in which they co-operate together, and FIGURE 2 shows a diagrammatic representation of the sequence of operations carried out by the data handling apparatus.

The apparatus comprises a main store 5, shown in part only and having a large capacity for storing data, and a subsidary store 6 having a much smaller data storage capacity. Both stores include a plurality of storage locations for storing items of data. In the subsidiary store each such storage location comprises a "data" location for storing a group of data digits and an "address" location for storing a group of address digits which identify the data group stored in that storage location with a particular address and hence storage location in the main store. The individual storage locations in the main store 5 are capable of storing only such groups of data digits. In the subsidiary store 6 the data locations are referenced A and the address locations are referenced B. There are 32 data locations and an equal number of address locations. The first data location will be referred to as A(0), the second as A(1) and so on, the last one being A(31); similarly, the address location associated with the first data location will be referred to as B(0), the address location associated with the second data location will be referred to as B(1) and so on, the address location associated with the last data location being referred to as B(31). Also associated with each data location in the subsidiary store is an indicator location C, the respective indicator locations being referred to as C(0), C(1) . . . C(31) in a similar fashion to the data locations and address locations.

The items of data stored in the subsidiary store all originate from a storage location in the main store and all are also retained in store in the main store. However, at any particular time an item of data stored in the subsidiary store may have a value different from that of the same item of data stored in the main store the original value having been modified in some subsequent access to the subsidiary store. In all cases, nevertheless, an item of data in the subsidiary store has the same address as does the same item of data stored in the main store.

The items of data are divided into two classes which are treated differently as will be explained later; one class includes items of data having a higher priority than the items in the other class.

As will be explained more fully later, the subsidiary store always has one empty or free storage location. The subsidiary store has a much higher speed of operation (or access) than the main store.

A data control unit 7 is provided and controls the flow of data into and out of the subsidiary store 6. The data control unit 7 is connected to the subsidiary store by a line 8 and to the main store by a line 9. The data control unit is also connected by means of a line 10 to a data transmitting unit 11, by means of which items of data may be supplied from, or fed into, the apparatus on a line 12.

An input unit 13 has an input line 14 on which input signals representing or identifying the addresses of items of data to which access is required are received. These input signals are fed by line 15 into a comparison unit 16. A first scanner 17 is provided which, when operative, is stepped past all the address locations B in the subsidiary store in turn by a device 17A and reads out in turn the addresses (in the address locations B) of all the items of data stored in the subsidiary store. These addresses are read into the comparison unit 16 on a line 18.

The comparison unit 16 is connected to the main store 5 and the control unit 7 by means of lines 19 and 20 respectively.

A second scanner 21, the purpose of which will be explained later, is provided. This scanner 21 is controlled by a device 21A and, when operative, is stepped past all the indicator locations C of the subsidiary store in turn. The scanner 21 is connected to the control unit 7 by means of a line 22.

The operation of the apparatus will now be described.

When access to a particular item of data is required by an input signal received on line 14, the appropriate address as identified by the input signal is passed by means of the input unit 13 and the line 15 to the comparison unit 16. At the same time, the scanning device 17A is rendered operative and the scanner 17 reads out the addresses identified in the address locations of the subsidiary store. The comparison unit 16 compares the address received on the line 15 with the addresses received successively on the line 18. If this comparison indicates that the item of data to which access is required is stored in the subsidiary store 6 the comparison unit 16 sends the address of the storage location in the subsidiary store storing that item of data to the data control unit 7 through the line 20, and the control unit then provides access to and reads out the item of data and transmits it to the transmitting unit 11 whence it is presented on the line 12. Thereupon the scanner 17 is reset to the datum position illustrated and remains inoperative until the next input signal is received on line 14. It will be seen that the main store 5 is not involved in the process described so far, and that, because of the much greater speed of operation of the subsidiary store, the speed with which access to an item of data is obtained is much higher than it would have been if access had been made instead to the corresponding item of data stored in the main store 5.

Each indicator location C may be set in a "1" state or in a "0" state. Initially all the indicator locations are in the "0" state, but when access to an item of the data in the subsidiary store is obtained and the data is passed to the transmitting unit 11, the appropriate indicator location is set to the "1" state by the comparison unit 16.

If the comparison of addresses made by the comparison unit 16 indicates that the particular item of data to which access is required is not stored in the subsidiary store 6 (that is, the address fed into the unit 16 on the line 15 is not the same as any of the addresses read out by the scanner 17 from the subsidiary store 6) then the comparison unit 16 feeds the address of the item of data to which access is required to the main store 5 on the line 19. The main store thereupon provides access to the storage location identified by the input signal and passes the desired item of data to the data control unit 7 on the line 9 from whence it is sent to the transmitting unit 11 and finally presented on the line 12. It will be appreciated that, because of the relative slowness of operation (or access) of the main store 5, the time taken to provide access to the item of data in the main store is much longer than if access had been possible to the subsidiary store 6.

In addition, when an item of data to which access is required is not in the subsidiary store 6 and has to be obtained from the main store, provided that the item of data is one of the higher-priority items of data the data control unit 7 acts to store that item of data in a storage location of the subsidiary store, as well as to present it to the transmitting unit 11. This item of data is placed in the selected next free or empty data location in the subsidiary store, and in a manner to be described later one of the items of data already stored in the subsidiary store is selected and removed so as to leave empty or free a further data location. If, however, the item of data is not one of the higher-priority items of data, it is not placed into the subsidiary store. The process by which a higher-priority item of data is placed into the selected next empty storage location will now be explained.

The scanning device 21A is arranged so that it causes the scanner 21 to rest always at the empty or next free data location. It therefore provides a signal on line 22 indicating which data location is empty. Thus when a signal representing an accessed item of data appears on the line 9 from the main store and causes that item of data to be presented by the output unit 11, the control unit 7 also stores this item of data in the said next free storage location whose identity is provided on the line 22.

When the empty data location has been filled in this way, the scanner 21 steps on and senses in turn the state of each indicator location C. If an indicator location scanned is in the "1" state, it is automatically reset by the scanner 21 to the "0" state. During this scanning process the scanner 21 is arranged to come to rest automatically at the first indicator location C which is already in the "0" state. Since each indicator location is set to the "1" state when data from the corresponding data location is accessed, the data in the data location corresponding to the first indicator location scanned which is found in the "0" state must be item of data to which access has been required least recently of all the items of data in the subsidiary store. The identity of the data location containing this item of data is then passed to the unit 7 by means of the line 22 and the data in this data location is transferred to the appropriate storage location in the main store, leaving the data location in the subsidiary store empty.

Therefore, each time an item of data to which access is required is not found in the subsidiary store 6, access to the main store is obtained. At the same time, provided the item is a higher-priority item of data, that item is placed in the subsidiary store and the item of data in the subsidiary store to which access has least recently been required is then transferred to the main store. Thus at all times, the subsidiary store contains the items of data to which access is most frequently required, the criterion of "most frequently required" being in this particular case that of "recentness of last access requirement."

As has been explained, items of data which are not included in a class of higher-priority items are not stored in the subsidiary store however recently access to them is required. Such items may be, for example, data required by inherently slow operating peripheral equipment; access to such items of data is not required quickly so that no advantage is to be gained by storing them in the subsidiary store.

Input signals calling for access to lower-priority items of data may include means for identifying such items of data, and the comparison means may be arranged to respond to such identifying means by seeking access directly to the appropriate storage location in the main store. On the other hand, such identifying means may be stored together with the item of data in the appropriate storage location of the main store, and inhibiting means responsive to such identifying means when that storage location is accessed may be arranged to inhibit the storage of that item of data in the next free storage location of the subsidiary store.

Access to a particular item of data may be required for the purpose of reading-out that item so as to enable it to be used elsewhere in the computer, for example as an operand or an instruction and so on, or alternatively access may be required for the purpose of writing-in a new value for that item of data after carrying out some computer instruction.

FIG. 2 shows a diagrammatic representation of the sequence of operations described above, it being assumed that all the items of data are in the class of higher-priority items. Initially $x=0$, and therefor $B(x)$ is $B(0)$. Each step of the scanning device 17A steps the scanner 17 on to the next location. X represents the address of the item of data to which access is required by the input unit 13. $B(y)$ (where $y$ has its initial value) is the address location corresponding to the empty data location.

As has been explained, access to a particular item of data may be required in order to modify its value. If the item is a higher-priority item, then after the necessary access has been obtained the new value of the item is placed into the subsidiary store in place of the original value which is destroyed. The corresponding item of data in the main store still retains the original value, however. When at a later stage, the item of data becomes the item to which access has been least recently required, and consequently is removed from the subsidiary store in order to leave its storage location empty, it is fed from the subsidiary store into the appropriate location in the main store in order to replace the item having the original value which has hitherto been stored in the main store.

In order to perform the above operation, the apparatus may be arranged so that whenever an item of data is removed from the subsidiary store in order to leave an empty location, it is always fed into the appropriate location in the main store in order to ensure that the value of the item in the main store includes any modifications which may have been made to the value in the subsidiary store. However, this operation may be performed in other ways. For example, the apparatus may include a set of indicators, one associated with each data location in the subsidiary store, each indicator being arranged to indicate whether the value of the item of data in the associated location has been modified at all since the item of data was first entered into the location from the main store. If the indicator indicates that no such modification has taken place, then when the item of data is to be removed from the subsidiary store in order to leave an empty location, the item is not fed into the main store. If, on the other hand, the indicator indicates that a modification to the value has taken place, then when that item is to be removed from the subsidiary store in order to leave an empty location, it is fed into the main store.

If desired, the apparatus may include a second inhibiting means operative to prevent certain items of data from being removed from the subsidiary store even though they may, at certain times, be the items to which access has been least recently required. If, for example, access to an item is normally required very frequently, but for a short period in a programme of operations is not required at all, then the second inhibiting means would operate to prevent the item being removed even though it were to become the item least recently required during that short period. Such a second inhibiting means may respond for example to "inhibit" information stored in the storage location of the subsidiary store containing an item of the higher-priority class, and be effective in response to the detection thereby of such "inhibit" information to prevent the scanning means 21 selecting as the next free storage location that particular storage location, even though its indicator location might be in the "0" state.

If desired, all items of data may be treated at will as though they are of the higher-priority class of data items.

In a further embodiment of the invention, the criterion of "recentness of last access requirement" is not used when determining the item of data in the subsidiary store to which access is most frequently required. Instead, the items of data stored in the subsidiary store are those items to which access has most frequently been required in a given period of time immediately preceding the occurrence of an access to the main store. In such an embodiment, the selection of the least frequently accessed item of data for removal from the subsidiary store when a fresh item is placed in the subsidiary store is carried out by counting means which in effect counts in respect of each storage location the number of times access to the item of data stored therein has been required in a recent given period of time, the counting means being effective to remove the item to which access has least often been required in the given period of time.

In other embodiments of the invention, other criteria may be used to determine the items of data to which accesses are most frequently required and the scope of the invention includes embodiments making use of such other criteria.

The apparatus may be arranged so that certain operations, in particular the comparison of the address in the address locations B with the address of the data required, are carried out in parallel form, rather than in serial form.

If desired, the storage locations of the main store may be arranged to store in addition to the respective groups of data digits the respective associated groups of address digits.

What I claim as my invention and desire to secure by Letters Patent is:

1. An electric data handling apparatus comprising a first store having a plurality of storage locations each capable of storing a group of digits (referred to hereafter as a "data group") and each having a unique address in the store, a second store which in relation to the first store is capable of giving substantially faster access to data stored therein and has a substantially smaller number of storage locations, each of these latter storage locations being capable of storing a data group obtained from a storage location in the first store, together with a group of digits (referred to hereafter as an "address group") signifying the address in the first store from whence the associated data group originated, an input channel for receiving input signals each identifying an address of a storage location to which access is required for the purpose of reading-out or otherwise modifying the data group stored at that address, comparison means responsive to each such input signal for comparing the address identified by the input signal with the respective addresses identified by the respective address groups stored in the second store and effective in the event of finding in one of the stored address groups an address corresponding with that identified by the input signal to provide access to the storage location of the second store which contains that stored address group, and in the event of not finding in the stored address groups such a corresponding address to produce a stimulating signal, accessing means responsive to each such stimulating signal for providing access to the storage location of the first store as identified by the input signal, and for causing the data group stored in that storage location to be stored, together with its associated address group, in a selected "free" storage location in the second store, and selecting means responsive to each such stimulating signal for selecting as the next free storage location in the second store that storage location to which in an immediately preceding time period access has least frequently been required by the input signals received, and inhibiting means responsive to "inhibit" information stored in a storage location of the first store for the purpose of identifying the data group stored in that storage location as one requiring slower access only, the inhibiting means being effective in response to the detection thereby of such inhibit information to prevent the accessing means causing the storage of such a data group in the second store.

2. An electric data handling apparatus according to claim 1, including inhibiting means (referred to hereafter as the second inhibiting means) responsive to "inhibit" informaton stored in a storage location of the second store for the purpose of identifying the data group stored in that storage location as one requiring faster access only, this second inhibiting means being effective in response to the detection thereby of such inhibit information to prevent the selecting means from selecting as the said next free storage location any such storage location which has such inhibit information stored therein.

3. An electric data handling apparatus according to claim 1, including modifying means for effecting modification of a data group stored in a storage location of the first store as identified by the address group in the selected next free storage location of the second store in accordance with the data group then stored in that next free storage location before the accessing means, in response to a subsequent stimulating signal, causes a data group stored in the first store to be stored in that next free storage location of the second store.

4. An electric data handling apparatus according to claim 1, wherein each storage location of the first store is arranged to store in addition to the data group the associated address group.

5. An electric data handling apparatus according to claim 1, wherein the selecting means is arranged to select as the next free storage location that storage location of the second store to which, since the selecting means made its previous selection, access has least recently been required by the input signals.

6. An electric data handling apparatus according to claim 3, including in each storage location of the second store an additional storage means capable of being set to indicate that the data group stored in that storage location has been modified since it was originally transferred thereto from the first store, means responsive to the occurrence of each access provided by the comparison means for setting the additional storage means in the storage location to which access is provided, and means responsive to the state of such additional storage means for inhibiting the said modifying means so as to prevent it attempting to modify the corresponding data group in the first store whenever such additional storage means is not in the "set" state.

7. An electric data handling apparatus according to claim 5, including inhibiting means responsive to "inhibit" information stored in a storage location of the first store for the purpose of identifying the data group stored in that storage location as one requiring slower access only, the inhibiting means being effective in response to the detection thereby of such inhibit information to prevent the accessing means causing the storage of such a data group in the second store.

8. An electric data handling apparatus according to claim 5, including inhibiting means (referred to hereafter as the second inhibiting means) responsive to "inhibit" information stored in a storage location of the second store for the purpose of identifying the data group stored in that storage location as one requiring faster access only, this second inhibiting means being effective in response to the detection thereby of such inhibit information to prevent the selecting means from selecting as the said next free storage location any such storage location which has such inhibit information stored therein.

9. An electric data handling apparatus according to claim 5, including modifying means for effecting modification of a data group stored in a storage location of the first store as identified by the address group in the selected next free storage location of the second store in accordance with the data group then stored in that next free storage location before the accessing means, in response to a subsequent stimulating signal, causes a data group stored in the first store to be stored in that next free storage location of the second store.

10. An electric data handling apparatus according to claim 5, wherein each storage location of the first store is arranged to store in addition to the data group the associated address group.

11. An electric data handling apparatus according to claim 5, wherein each storage location of the second store includes a further storage means capable of being set and reset, and including means for setting the respective further storage means whenever the associated storage location is accessed by the comparison means in response to the receipt of an input signal, and wherein the selecting means includes means for scanning in a predetermined sequence the said further storage means of the respective storage locations of the second store and for resetting each such further storage means which has been set and for interrupting the scanning process whenever one such further storage means which has not been set is encountered, the associated storage location being thereby selected as the next free storage location, and the scanning process being continued only in response to the receipt of the next stimulating signal.

12. An electric data handling apparatus according to claim 7, including inhibiting means (referred to hereafter as the second inhibiting means) responsive to "inhibit" information stored in a storage location of the second store for the purpose of identifying the data group stored in that storage location as one requiring faster access only, this second inhibiting means being effective in response to the detection thereby of such inhibit information to prevent the selecting means from selecting as the said next free storage location any such storage location which has such inhibit information stored therein.

13. An electric data handling apparatus according to claim 9, including in each storage location of the second store an additional storage means capable of being set to indicate that the data group stored in that storage location has been modified since it was originally transferred thereto from the first store, means responsive to the occurrence of each access provided by the comparison means for setting the additional storage means in the storage location to which access is provided, and means responsive to the state of such additional storage means for inhibiting the said modifying means so as to prevent it attempting to modify the corresponding data group in the first store whenever such additional storage means is not in the "set" state.

14. A computer memory system comprising: a main memory; a scratch-pad memory of relatively low capacity and high speed, having a plurality of locations each of which comprises a data register for storing a word of information, an address register for storing an address identifying that word, and a bistable indicator; means for accessing a desired word (as defined by an address supplied to the system) from the scratch-pad memory or the main memory according as the word is or is not stored in the scratch-pad memory; means for setting the indicator of any location to the "1" state when the word stored therein is accessed; displacement selection means comprising scanning means for scanning each location in the scratch-pad memory in cyclic sequence until a location is reached whose indicator is in the "0" state and means for setting the indicator of each scanned location to the "0" state; transfer means for reading the word in the location at which the scanning means cease scanning, thereby leaving an empty location, and writing it into the main memory; and writing means for writing an accessed word together with its address into an empty location in the scratch-pad memory if the word is not already stored in the scratch-pad memory.

15. A computer memory system according to claim 14, and including inhibit means responsive to "inhibit" information stored in the main memory together with a word to prevent the operation of the writing means when the accessing means reads that word from the main memory.

References Cited

UNITED STATES PATENTS

| | | | |
|---|---|---|---|
| 3,217,298 | 11/1965 | Kilburn et al. | 340—172.5 |
| 3,218,611 | 11/1965 | Kilburn et al. | 340—172.5 |
| 3,248,702 | 4/1966 | Kilburn et al. | 340—172.5 |

PAUL J. HENON, *Primary Examiner.*

R. B. ZACHE, *Assistant Examiner.*